US009867203B2

(12) United States Patent
Bhattad et al.

(10) Patent No.: US 9,867,203 B2
(45) Date of Patent: Jan. 9, 2018

(54) SYNCHRONOUS TDM-BASED COMMUNICATION IN DOMINANT INTERFERENCE SCENARIOS

(75) Inventors: Kapil Bhattad, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 12/499,432

(22) Filed: Jul. 8, 2009

(65) Prior Publication Data

US 2010/0008282 A1    Jan. 14, 2010

Related U.S. Application Data

(60) Provisional application No. 61/080,025, filed on Jul. 11, 2008.

(51) Int. Cl.
| | |
|---|---|
| *H04L 12/26* | (2006.01) |
| *H04W 72/08* | (2009.01) |

(Continued)

(52) U.S. Cl.
CPC ............ *H04W 72/082* (2013.01); *H04J 3/02* (2013.01); *H04J 11/0069* (2013.01); *H04W 16/14* (2013.01); *H04W 16/32* (2013.01)

(58) Field of Classification Search
None
See application file for complete search history.

(56) References Cited

U.S. PATENT DOCUMENTS

| | | |
|---|---|---|
| 5,471,670 A | 11/1995 | Hess et al. |
| 6,714,775 B1 | 3/2004 | Miller |

(Continued)

FOREIGN PATENT DOCUMENTS

| | | |
|---|---|---|
| CN | 1753397 A | 3/2006 |
| CN | 1960195 A | 5/2007 |

(Continued)

OTHER PUBLICATIONS

3GPP TR 25.814 V1.2.0, 3rd Generation Partnership Project, Technical Specification Group Radio Access Network, Physical Layer Aspects for Evolved UTRA (Release 7), Internet Citation, Feb. 1, 2006 (Feb. 1, 2006), XP002400401, Retrieved from the Internet: URL: http://www.3gpp.org/ftp/Specs/html—info/25814.htm [retrieved on Sep. 26, 2006].

(Continued)

*Primary Examiner* — Nicholas Sloms
(74) *Attorney, Agent, or Firm* — Nerrie M. Zohn

(57) ABSTRACT

Techniques for supporting communication in a heterogeneous network are described. In an aspect, communication in a dominant interference scenario may be supported by reserving subframes for a weaker base station observing high interference from a strong interfering base station. In another aspect, interference due to a first reference signal from a first station (e.g., a base station) may be mitigated by canceling the interference at a second station (e.g., a UE) or by selecting different resources for sending a second reference signal by the second station (e.g., another base station) to avoid collision with the first reference signal. In yet another aspect, a relay may transmit in an MBSFN mode in subframes that it listens to a macro base station and in a regular mode in subframes that it transmits to UEs. In yet another aspect, a station may transmit more TDM control symbols than a dominant interferer.

23 Claims, 9 Drawing Sheets

(51) Int. Cl.
*H04W 16/14* (2009.01)
*H04J 11/00* (2006.01)
*H04J 3/02* (2006.01)
*H04W 16/32* (2009.01)

(56) References Cited

U.S. PATENT DOCUMENTS

| | | | |
|---|---|---|---|
| 6,782,255 | B1 | 8/2004 | Ranta et al. |
| 6,888,805 | B2 | 5/2005 | Bender et al. |
| 6,952,589 | B1 | 10/2005 | Mantha |
| 7,020,110 | B2 | 3/2006 | Walton et al. |
| 7,280,467 | B2 | 10/2007 | Smee et al. |
| 8,259,603 | B2 | 9/2012 | Kuroda et al. |
| 8,265,033 | B2 | 9/2012 | Gunnarsson et al. |
| 2002/0085641 | A1 | 7/2002 | Baum |
| 2002/0103001 | A1 | 8/2002 | Weissman |
| 2003/0003906 | A1 | 1/2003 | Demers et al. |
| 2003/0016174 | A1 | 1/2003 | Anderson |
| 2003/0045318 | A1 | 3/2003 | Subrahmanya |
| 2003/0125026 | A1 | 7/2003 | Tsunehara et al. |
| 2003/0174676 | A1 | 9/2003 | Willenegger et al. |
| 2004/0116122 | A1 | 6/2004 | Zeira et al. |
| 2004/0146093 | A1 | 7/2004 | Olson et al. |
| 2005/0036441 | A1 | 2/2005 | Laroia et al. |
| 2005/0096062 | A1 | 5/2005 | Ji et al. |
| 2005/0099973 | A1 | 5/2005 | Qiu et al. |
| 2005/0254555 | A1 | 11/2005 | Teague et al. |
| 2006/0018297 | A1 | 1/2006 | Gorokhov |
| 2006/0223461 | A1 | 10/2006 | Laroia et al. |
| 2007/0010198 | A1 | 1/2007 | McKay |
| 2007/0042784 | A1 | 2/2007 | Anderson et al. |
| 2007/0058595 | A1 | 3/2007 | Classon et al. |
| 2007/0060050 | A1* | 3/2007 | Lee et al. .................. 455/13.1 |
| 2007/0086368 | A1* | 4/2007 | Lee .................. H04B 7/155 370/313 |
| 2007/0104151 | A1* | 5/2007 | Papasakellariou .. H04W 72/005 370/335 |
| 2007/0104164 | A1 | 5/2007 | Laroia et al. |
| 2007/0121484 | A1 | 5/2007 | Kim et al. |
| 2007/0177501 | A1 | 8/2007 | Papasakellariou |
| 2007/0298798 | A1 | 12/2007 | Hagerman et al. |
| 2008/0025240 | A1 | 1/2008 | Casaccia et al. |
| 2008/0037409 | A1 | 2/2008 | Ogawa et al. |
| 2008/0080629 | A1 | 4/2008 | Munzner |
| 2008/0081626 | A1 | 4/2008 | Choi et al. |
| 2008/0101506 | A1 | 5/2008 | Jayaraman et al. |
| 2008/0130593 | A1 | 6/2008 | Scheinert et al. |
| 2008/0146154 | A1 | 6/2008 | Claussen et al. |
| 2008/0171546 | A1 | 7/2008 | Hyon et al. |
| 2008/0232504 | A1 | 9/2008 | Ma et al. |
| 2008/0240054 | A1* | 10/2008 | Sandhu et al. ................ 370/338 |
| 2008/0253300 | A1 | 10/2008 | Wakabayashi et al. |
| 2008/0253484 | A1 | 10/2008 | Kakura et al. |
| 2008/0279296 | A1 | 11/2008 | Roh et al. |
| 2008/0318579 | A1 | 12/2008 | McCoy et al. |
| 2009/0047971 | A1 | 2/2009 | Fu |
| 2009/0069043 | A1 | 3/2009 | Roh et al. |
| 2009/0154580 | A1 | 6/2009 | Ahn et al. |
| 2009/0185483 | A1 | 7/2009 | McBeath et al. |
| 2009/0185521 | A1 | 7/2009 | Li et al. |
| 2009/0316659 | A1 | 12/2009 | Lindoff et al. |
| 2009/0325590 | A1 | 12/2009 | Liu et al. |
| 2010/0008282 | A1 | 1/2010 | Bhattad et al. |
| 2010/0008283 | A1* | 1/2010 | Chitrapu .................. H04B 7/026 370/312 |
| 2010/0034076 | A1 | 2/2010 | Kishiyama et al. |
| 2010/0067417 | A1* | 3/2010 | Zhou et al. .................. 370/311 |
| 2010/0081388 | A1 | 4/2010 | Han et al. |
| 2010/0118706 | A1* | 5/2010 | Parkvall et al. ............. 370/241 |
| 2010/0128690 | A1 | 5/2010 | McBeath et al. |
| 2010/0220666 | A1 | 9/2010 | Imamura et al. |
| 2010/0272032 | A1 | 10/2010 | Sayana et al. |
| 2011/0069742 | A1 | 3/2011 | Narayan et al. |
| 2011/0286346 | A1 | 11/2011 | Barbieri et al. |
| 2011/0292903 | A1 | 12/2011 | Joengren et al. |
| 2013/0242959 | A1 | 9/2013 | Bhattad et al. |
| 2013/0250855 | A1 | 9/2013 | Bhattad |

FOREIGN PATENT DOCUMENTS

| | | |
|---|---|---|
| CN | 101018220 A | 8/2007 |
| CN | 101056285 A | 10/2007 |
| CN | 101159530 A | 4/2008 |
| CN | 101197803 A | 6/2008 |
| EP | 1739850 A2 | 1/2007 |
| EP | 1976317 A1 | 10/2008 |
| JP | 2003209879 A | 7/2003 |
| JP | 2007189619 A | 7/2007 |
| JP | 2007300384 A | 11/2007 |
| JP | 2008118310 A | 5/2008 |
| KR | 20050030508 A | 3/2005 |
| RU | 2315433 C1 | 1/2008 |
| TW | 200812282 A | 3/2008 |
| WO | WO-0232003 A1 | 4/2002 |
| WO | 2002078371 | 10/2002 |
| WO | WO-03001834 A1 | 1/2003 |
| WO | WO-2004064295 A2 | 7/2004 |
| WO | 2005032004 A1 | 4/2005 |
| WO | WO2007024895 A2 | 3/2007 |
| WO | 2007102684 A1 | 9/2007 |
| WO | 2008020162 A2 | 2/2008 |
| WO | 2008127185 A1 | 10/2008 |
| WO | 2009099810 | 8/2009 |
| WO | 2009099811 A1 | 8/2009 |
| WO | 2009117658 A1 | 9/2009 |
| WO | 2009120934 A1 | 10/2009 |
| WO | 2010003034 A1 | 1/2010 |
| WO | 2010006285 A2 | 1/2010 |

OTHER PUBLICATIONS

3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), 3GPP-Standards, 2500 Wilson Boulevard, Suite 300, Arlington, Virginia 22201 USA, Sep. 1, 2006 (Sep. 1, 2006), XP040282759 see 9.3.2.4 (p. 100) to 9.3.3.1 (p. 102).

European Search Report—EP11159041—Search Authority—The Hague—dated May 10, 2011.

European Search Report—EP11159044—Search Authority—Hague—dated May 11, 2011.

Huawei: "MBSFN Subframe Allocation Signaling" 3GPP Draft; R2-081693, 3rd Generation Partnership Project (3GPP), Mobile Competence Centre ; 650, Route Des Lucioles ; F-06921 Sophia-Antipolis Cedex ; France, vol. RAN WG2, No. Shenzhen, China; Mar. 25, 2008, Mar. 25, 2008 (Mar. 25, 2008), XP050139407 [retrieved on Mar. 25, 2008].

Huawei: "MBSFN Subframe Indication" 3GPP Draft; R1-071690, 3rd Generation Partnership Project (3GPP), Mobile Competence Centre ; 650, Route Des Lucioles ; F-06921 Sophia-Antipolis Cedex ; France, vol. RAN WG1, No. St . Julian; Apr. 3, 2007, Apr. 3, 2007 (Apr. 3, 2007), XP050105613 [retrieved on Apr. 3, 2007].

International Search Report and Written Opinion—PCT/US2009/050289—ISA/EPO—dated Mar. 26, 2010.

Huawei: "Physical layer technologies for LTE-Advanced", 3GPP TSG RAN WG1#53, R1-081838, May 9, 2008.

Nortel, "Transparent relay for LTE-A FDD", R1-082517, RAN1 #53bis, Jun. 2008.

QUALCOMM Europe: "Initial Evaluation of Relay Performance", 3GPP TSG-RAN WG1 #55bis R1-090370, Jan. 12, 2009, URL, http://www.3gpp.org/ftp/tsg_ran/wg1_rl1/TSGR1_55b/Docs/R1-090370.zip..

QUALCOMM Europe: "Operation of Relays in LIE-A", 3GPP TSG-RAN WG1 #55bis R1-090369, Jan. 12, 2009, URL, http://www.3gpp.org/ftp/tsg_ran/wg1_rl1/TSGR1_55b/Docs/R1-090369.zip.

(56) References Cited

OTHER PUBLICATIONS

Samsung: "Future 3GPP Radio Technologies for LIE-Advanced", 3GPP RAN Working Group 1 #53 R1-081722, May 5, 2008, pp. 9-18, URL, http://www.3gpp. org/ftp/tsg_ran/wg1_r11/TSGR1_53/Docs/R1-081722.zip.

ZTE: "Redundant signaling overhead on MSAP", 3GPP TSG RAN WG2 #64Bis R2-090317, Jan. 12, 2009, URL, http://www.3gpp.org/ftp/tsg_ran/wg2_r12/TSGR2_64bis/Docs/R2-090317.zip.

3rd Generation Partnership Project; Technical Specification Group Radio Access Network; Evolved Universal Terrestrial Radio Access (E-UTRA); Physical layer; Measurements (Release 9 ),3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V9.1.0, Mar. 30, 2010 (Mar. 30, 2010), pp. 1-14, XP050402151.

QUALCOMM Europe: "Advantages of synchronous network operation for LTE-A", 3GPP TSG-RAN WG1 #53bis R1-082555, Jun. 30-Jul. 4, 2008.

Samsung: "Discussions on CSI-RS for LTE-Advanced", 3GPP Draft; R1-093375 CSI RS Designs in LTE-A, 3rd Generation Partnership Project (3GPP), Mobile Competence Centre; 650, Route Des Lucioles; F-06921 Sophia-Antipolis Cedex; France, No. Shenzhen, China; Au. 19, 2009, Aug. 19, 2009 (Aug. 19, 2009), XP050351673.

3GPP TS 36.300 V8.4.0, "Evolved Universal Terrestrial Radio Access (E-UTRA) and Evolved Universal Terrestrial Radio Access Network", Overall description, Stage 2, Mar. 2008, http://www.3gpp.org/ftp/tsg_ran/WG2_RL2/Specifications/200803_draft_specs_after_RAN_39/draft_36300-840.zip.

Ritt, et al., "TP on uplink inter-cell interference cancellation" 3GPP Draft; R1-060418, 3rd Generation Partnership Project (3GPP), Mobile Competence Centre ; 650, Route Des Lucioles ; F-06921 Sophia-Antipolis Cedex ; France, vol. RAN WG1, No. Denver, USA; Feb. 9, 2006, Feb. 9, 2006 (Feb. 9, 2006), XP050101362 [retrieved on Feb. 9, 2006] the whole document.

Ritt, Huawei, CATT "Combining Inter-cell-interference co-ordination/avoidance with cancellation in uplink and TP", R1-060419, 3GPP TSG-RAN WG1 LTE Ad Hoc Meeting Helsinki, Finland, Jan. 23-25, 2006.

Taiwan Search Report—TW098123476—TIPO—Feb. 19, 2013.
Taiwan Search Report—TW098123476—TIPO—Jun. 25, 2013.

Drieberg M., et al., "An improved distributed dynamic channel assignment scheme for dense WLANs," 6th International Conference on Information, Communications & Signal Processing, 2007, pp. 1-5.

Taiwan Search Report—TW102117389—TIPO—Oct. 1, 2014.

NTT DOCOMO et al., "Scrambling Code in E-UTRA Downlink", 3GPP Draft; R1-062712 DL Scrambling Code, 3rd Generation Partnership Project (3GPP), Mobile Competence Centre ; 650, Route Des Lucioles ; F-06921 Sophia-Antipolis Cedex ; France, vol. RAN WGI, No. Seoul, Korea; Oct. 4, 2006, Oct. 4, 2006 (Oct. 4, 2006), XP050103200, [retrieved on Oct. 4, 2006]. meeting #46bis, pp. 1-6.

QUALCOMM Europe: "New Interference Scenarios in LTE-Advanced" 3GPP Draft; R1-082556, 3rd Generation Partnership Project (3GPP), Mobile Competence Centre; 650, Route Des Lucioles; F-06921 Sophia-Antipolis Cedex; France, vol. RAN WG1, No. Warsaw, Poland; Jun. 25, 2008, Jun. 25, 2008 (Jun. 25, 2008), XP050110817 [retrieved on Jun. 25, 2008] p. 1, paragraph 2.2—p. 2, meeting #53bis, pp. 1-3.

\* cited by examiner

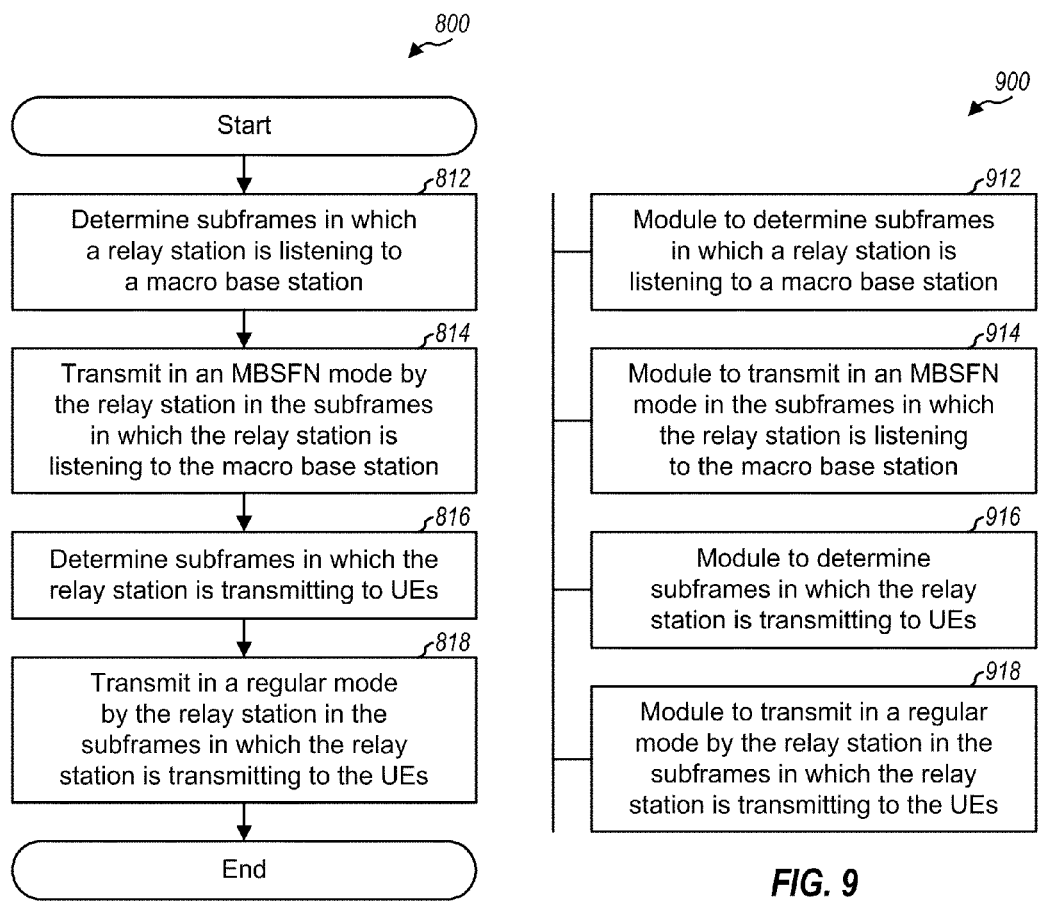

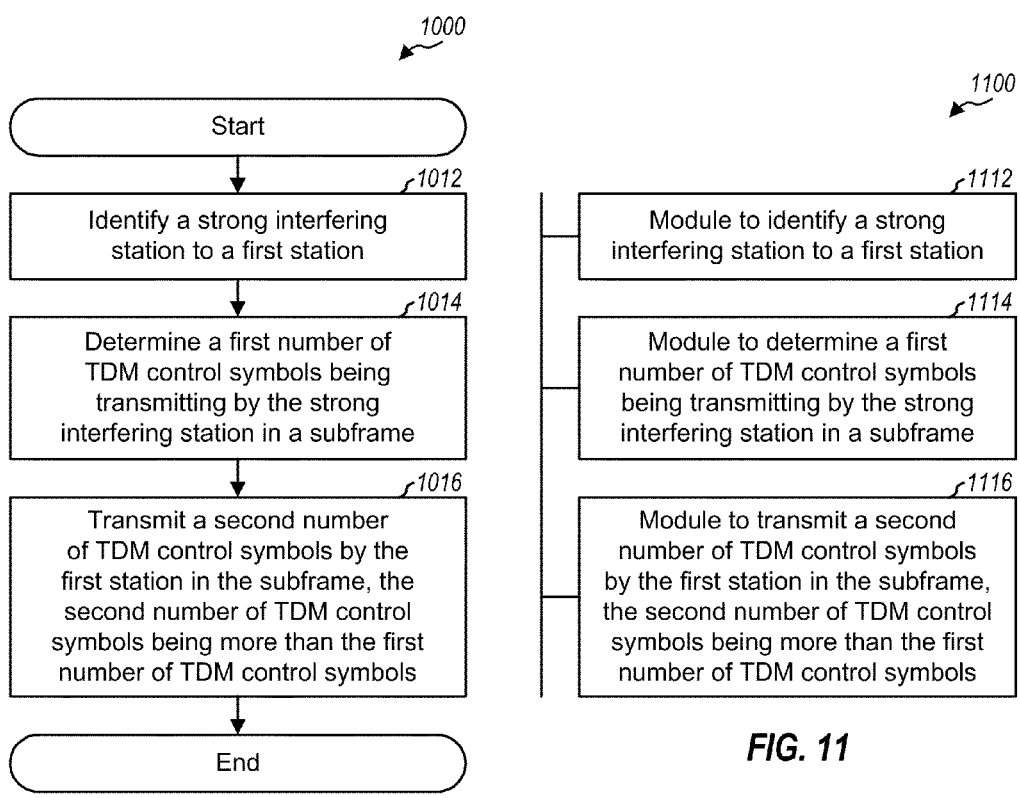

SYNCHRONOUS TDM-BASED COMMUNICATION IN DOMINANT INTERFERENCE SCENARIOS

The present application claims priority to provisional U.S. Application Ser. No. 61/080,025, entitled "ENABLING COMMUNICATIONS IN THE PRESENCE OF DOMINANT INTERFERER," filed Jul. 11, 2008, assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Techniques for supporting communication in a dominant interference scenario and for supporting operation of a relay station in a heterogeneous network are described herein. The heterogeneous network may include base stations of different transmit power levels. In a dominant interference scenario, a UE may communicate with a first base station and may observe high interference from and/or may cause high interference to a second base station. The first and second base stations may be of different types and/or may have different transmit power levels.

In an aspect, communication in a dominant interference scenario may be supported by reserving subframes for a weaker base station observing high interference from a strong interfering base station. An eNB may be classified as a "weak" eNB or a "strong" eNB based on the received power of the eNB at a UE (and not based on the transmit power level of the eNB). A UE can then communicate with the weaker base station in the reserved subframes in the presence of the strong interfering base station.

In another aspect, interference due to a reference signal in the heterogeneous network may be mitigated. A first station (e.g., a base station) causing high interference to or observing high interference from a second station (e.g., a UE or another base station) in the heterogeneous network may be identified. In one design, interference due to a first reference signal from the first station may be mitigated by canceling the interference at the second station (e.g., the UE). In another design, interference to the first reference signal may be mitigated by selecting different resources for sending a second reference signal by the second station (e.g., another base station) to avoid collision with the first reference signal.

In yet another aspect, a relay station may be operated to achieve good performance. The relay station may determine subframes in which it listens to a macro base station and may transmit in a multicast/broadcast single frequency network (MBSFN) mode in these subframes. The relay station may also determine subframes in which it transmits to UEs and may transmit in a regular mode in these subframes. The relay station may send a reference signal in fewer symbol periods in a subframe in the MBSFN mode than the regular mode. The relay station may also send fewer time division multiplexed (TDM) control symbols in a subframe in the MBSFN mode than the regular mode.

In yet another aspect, a first station may transmit more TDM control symbols than a dominant interferer in order to improve reception of the TDM control symbols by UEs. The first station (e.g., a pico base station, a relay station, etc.) may identify a strong interfering station to the first station. The first station may determine a first number of TDM control symbols being transmitted by the strong interfering station in a subframe. The first station may transmit a second (e.g., the maximum) number of TDM control symbols in the subframe, with the second number of TDM control symbols being more than the first number of TDM control symbols.

Various aspects and features of the disclosure are described in further detail below.

BRIEF DESCRIPTION OF THE DRAWINGS

FIGS. 8 and 9 show a process and an apparatus, respectively, for operating a relay station.
FIGS. 10 and 11 show a process and an apparatus, respectively, for transmitting control information in a wireless communication network.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
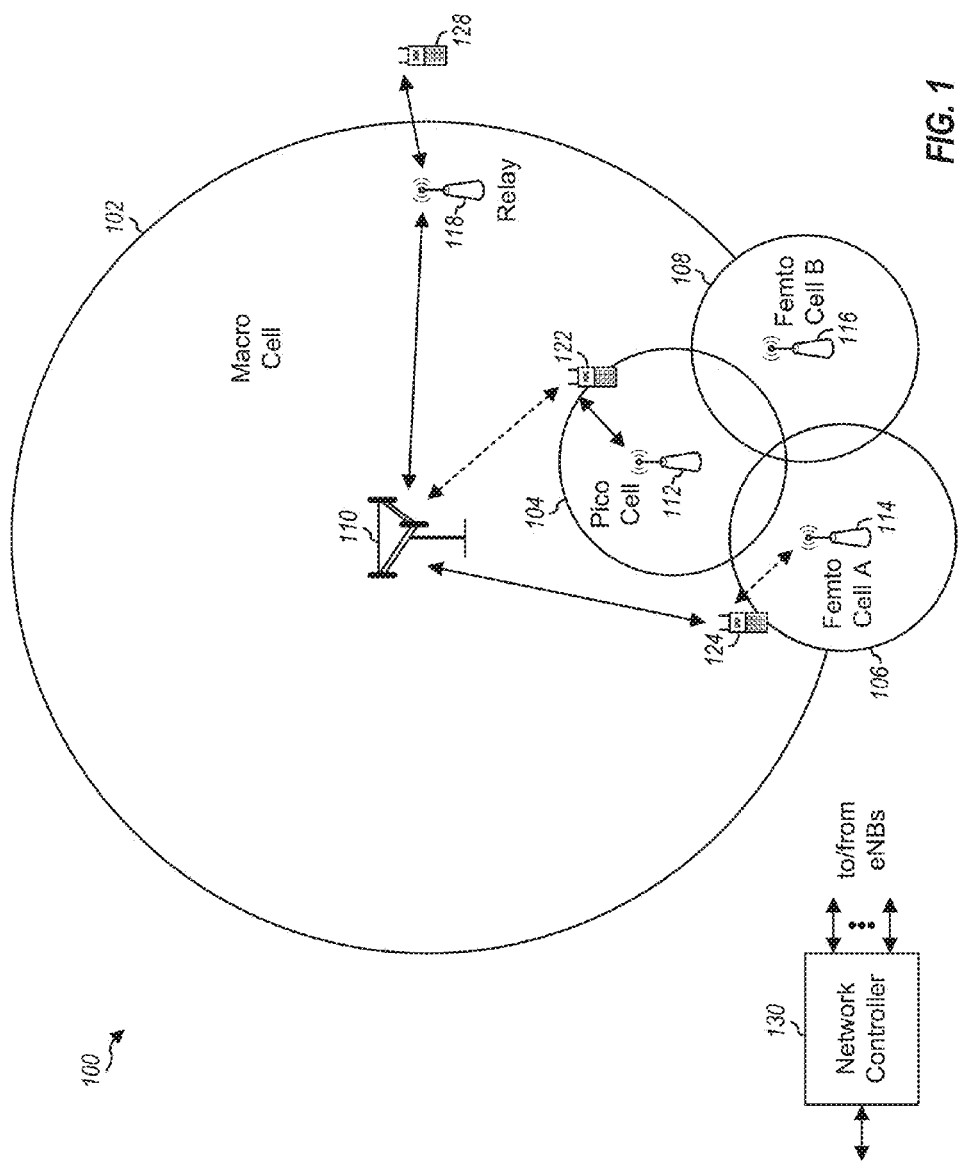
FIG. 1 shows a wireless communication network.

FIG. 1 shows a wireless communication network 100, which may be an LTE network or some other wireless network. Wireless network 100 may include a number of evolved Node Bs (eNBs) 110, 112, 114 and 116 and other network entities. An eNB may be a station that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNB 110 may be a macro eNB for a macro cell 102, eNB 112 may be a pico eNB for a pico cell 104, and eNBs 114 and 116 may be femto eNBs for femto cells 106 and 108, respectively. An eNB may support one or multiple (e.g., three) cells.

Wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 118 may communicate with macro eNB 110 and a UE 128 in order to facilitate communication between eNB 110 and UE 128. A relay station may also be referred to as a relay eNB, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs and relays may have a lower transmit power level (e.g., 1 Watt).

Wireless network 100 may support synchronous operation. For synchronous operation, the eNBs may have similar frame timing, and transmissions from different eNBs may be approximately aligned in time. Synchronous operation may support certain transmission features, as described below.

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 122, 124 and 128 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
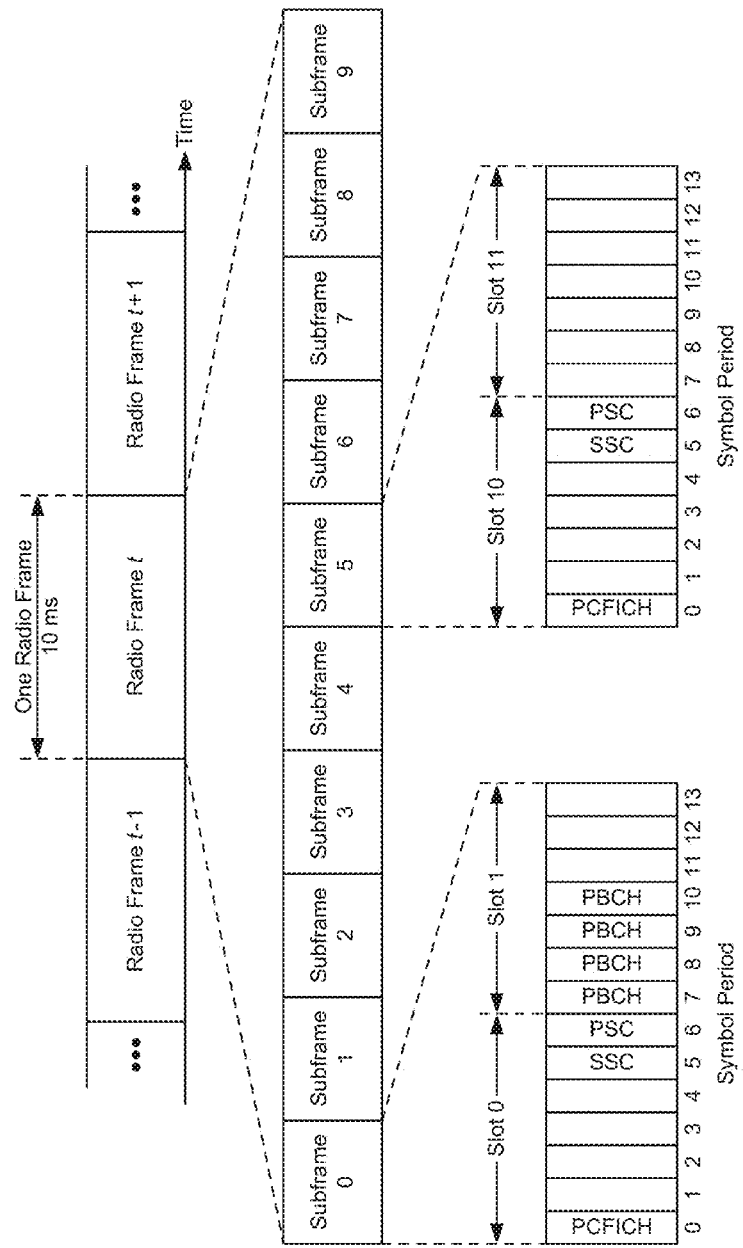
FIG. 2 shows an exemplary frame structure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1.

The available time frequency resources may be partitioned into resource blocks. Each resource block may cover N subcarriers (e.g., 12 subcarriers) in one slot and may include a number of resource elements. Each resource element may cover one subcarrier in one symbol period and may be used to send one modulation symbol, which may be a real or complex value. An eNB may transmit one OFDM symbol in each symbol period. Each OFDM symbol may include modulation symbols on subcarriers used for transmission and zero symbols with signal value of zero on the remaining subcarriers.

In LTE, an eNB may send a primary synchronization signal (PSS) and a secondary synchronization signal (SSS) in the center 1.08 MHz of the system bandwidth for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell search and acquisition. The eNB may send a Physical Broadcast Channel (PBCH) in symbol periods 0 to 3 in slot 1 of subframe 0 in certain radio frames. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels in a subframe, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic retransmission (HARQ). The PDCCH may carry information on resource allocation for UEs and control information for downlink channels. The first M OFDM symbols of the subframe may also be referred to as TDM control symbols. A TDM control symbol may be an OFDM symbol carrying control information. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

LTE supports transmission of unicast information to specific UEs. LTE also supports transmission of broadcast information to all UEs and multicast information to a group of UEs. A multicast/broadcast transmission may also be referred to as an MBSFN transmission. A subframe used for sending unicast information may be referred to as a regular subframe. A subframe used for sending multicast and/or broadcast information may be referred to as an MBSFN subframe.

Figure 3:
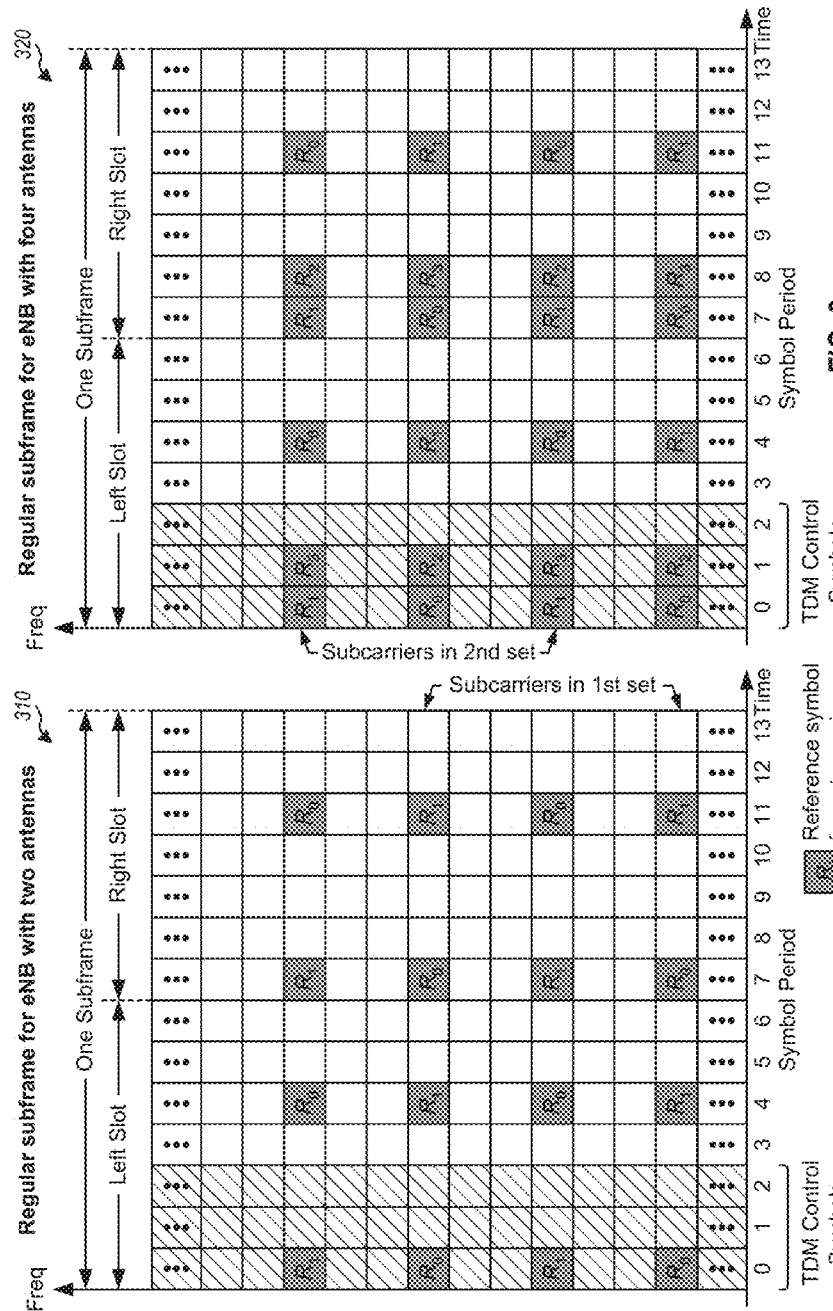
FIG. 3 shows two exemplary regular subframe formats.

FIG. 3 shows two exemplary regular subframe formats 310 and 320 that may be used to send unicast information to specific UEs on the downlink. For the normal cyclic prefix in LTE, the left slot includes seven symbol periods 0 through 6, and the right slot includes seven symbol periods 7 through 13.

Subframe format 310 may be used by an eNB equipped with two antennas. A cell-specific reference signal may be sent in symbol periods 0, 4, 7 and 11 and may be used by UEs for channel estimation. A reference signal is a signal that is known a priori by a transmitter and a receiver and may also be referred to as pilot. A cell-specific reference signal is a reference signal that is specific for a cell, e.g., generated with one or more symbol sequences determined based on a cell identity (ID). For simplicity, a cell-specific reference signal may be referred to as simply a reference signal. In FIG. 3, for a given resource element with label $R_i$, a reference symbol may be sent on that resource element from antenna i, and no symbols may be sent on that resource element from other antennas. Subframe format 320 may be used by an eNB equipped with four antennas. A reference signal may be sent in symbol periods 0, 1, 4, 7, 8 and 11.

In the example shown in FIG. 3, three TDM control symbols are sent in a regular subframe with M=3. The PCFICH may be sent in symbol period 0, and the PDCCH and PHICH may be sent in symbol periods 0 to 2. The PDSCH may be sent in the remaining symbol periods 3 to 13 of the subframe.

Figure 4:
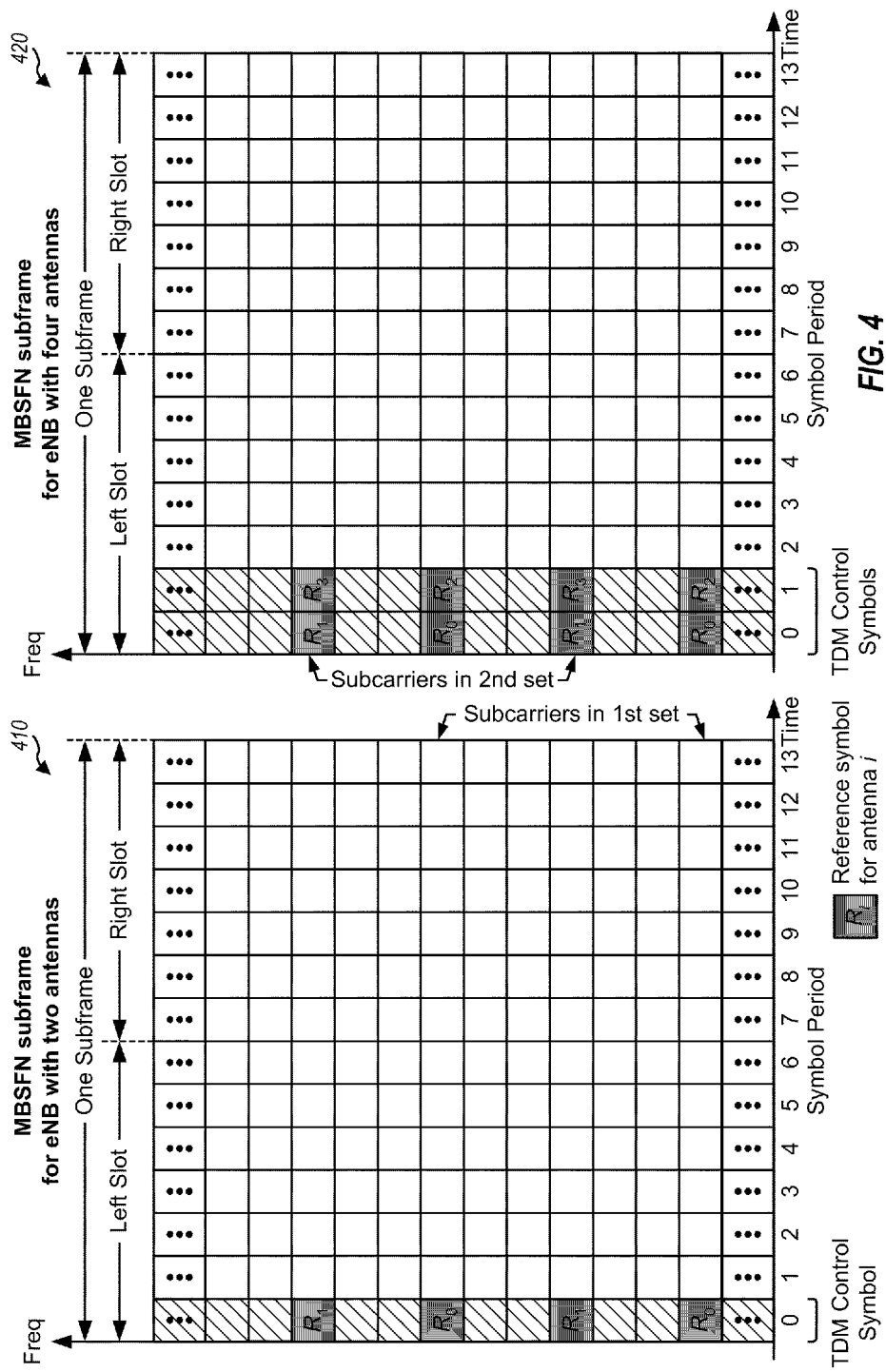
FIG. 4 shows two exemplary MBSFN subframe formats

FIG. 4 shows two exemplary MBSFN subframe formats 410 and 420 that may be used to send broadcast/multicast information to UEs on the downlink. Subframe format 410 may be used by an eNB equipped with two antennas. A reference signal may be sent in symbol period 0. For the example shown in FIG. 4, M=1 and one TDM control symbol may be sent in the MBSFN subframe. Subframe format 420 may be used by an eNB equipped with four antennas. A reference signal may be sent in symbol periods 0 and 1. For the example shown in FIG. 4, M=2 and two TDM control symbols may be sent in the MBSFN subframe.

In general, the PCFICH may be sent in symbol period 0 of an MBSFN subframe, and the PDCCH and PHICH may be sent in symbol periods 0 to M-1. Broadcast/multicast information may be sent in symbol periods M through 13 of the MBSFN subframe. Alternatively, no transmissions may be sent in symbol periods M through 13.

FIGS. 3 and 4 show some subframe formats that may be used for the downlink. Other subframe formats may also be used, e.g., for more than two antennas at the eNB.

An eNB or a relay may operate in a regular mode, an MBSFN mode, and/or other operating modes. The eNB or relay may switch mode from subframe to subframe, or at a slower rate. In the regular mode, the eNB or relay may transmit using a regular subframe format, e.g., as shown in FIG. 3. The regular mode may be associated with certain characteristics such as a configurable number of TDM control symbols, the reference signal being sent from each antenna in two or more symbol periods of a subframe, etc. In the MBSFN mode, the eNB or relay may transmit using an MBSFN subframe format, e.g., as shown in FIG. 4. The MBSFN mode may be associated with certain characteristics such as a minimum number of TDM control symbols, the reference signal being sent from each antenna in one symbol period of a subframe, etc. The eNB or relay may transmit control information and reference signal in fewer symbol periods in the MBSFN mode than the regular mode, e.g., as shown in FIGS. 3 and 4. The eNB or relay may also transmit fewer TDM control symbols in the MBSFN mode than the regular mode. The MBSFN mode may thus be desirable under certain operating scenarios, as described below.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 124 may be close to femto eNB 114 and may have high received power for eNB 114. However, UE 124 may not be able to access femto eNB 114 due to restricted association and may then connect to macro eNB 110 with lower received power (as shown in FIG. 1) or to femto eNB 116 also with lower received power (not shown in FIG. 1).

UE 124 may then observe high interference from femto eNB 114 on the downlink and may also cause high interference to eNB 114 on the uplink.

A dominant interference scenario may also occur due to range extension, which is a scenario in which a UE connects to an eNB with lower pathloss and possibly lower SNR among all eNBs detected by the UE. For example, in FIG. 1, UE 122 may detect macro eNB 110 and pico eNB 112 and may have lower received power for pico eNB 112 than macro eNB 110. Nevertheless, it may be desirable for UE 122 to connect to pico eNB 112 if the pathloss for pico eNB 112 is lower than the pathloss for macro eNB 110. This may result in less interference to the wireless network for a given data rate for UE 122.

In an aspect, communication in a dominant interference scenario may be supported by reserving subframes for a weaker eNB observing high interference from a strong interfering eNB. A UE can then communicate with the weaker eNB in the reserved subframes in the presence of the strong interfering eNB. An eNB may be classified as a "weak" eNB or a "strong" eNB based on the received power of the eNB at a UE (and not based on the transmit power level of the eNB). Furthermore, different eNBs may send their synchronization signals such that interference from a dominant interferer can be avoided.

In one design, eNBs and relays may be arranged into different groups. Each group may include eNBs and/or relays that are not dominant interferers of one another. For example, one group may include macro eNBs, another group may include pico eNBs and relays, and one or more groups may include femto eNBs. Relays may have a similar transmit power level as pico eNBs and may thus be grouped with the pico eNBs. Femto eNBs may be divided into multiple groups if they are dominant interferers of one another. By having each group includes eNBs that are not dominant interferers of one another, outage scenarios may be avoided and the benefits of range extension may be realized.

In one design, different groups of eNBs may be associated with different subframe offsets. The timing of eNBs in different groups may be offset from one another by an integer number of subframes. For example, when macro eNBs in a first group transmit subframe 0, pico eNBs in a second group may transmit subframe 1, femto eNBs in a third group may transmit subframe 2, etc. The use of subframe offset may allow eNBs and relays in different groups to transmit their synchronization signals such that UEs can detect these signals.

Figure 5:
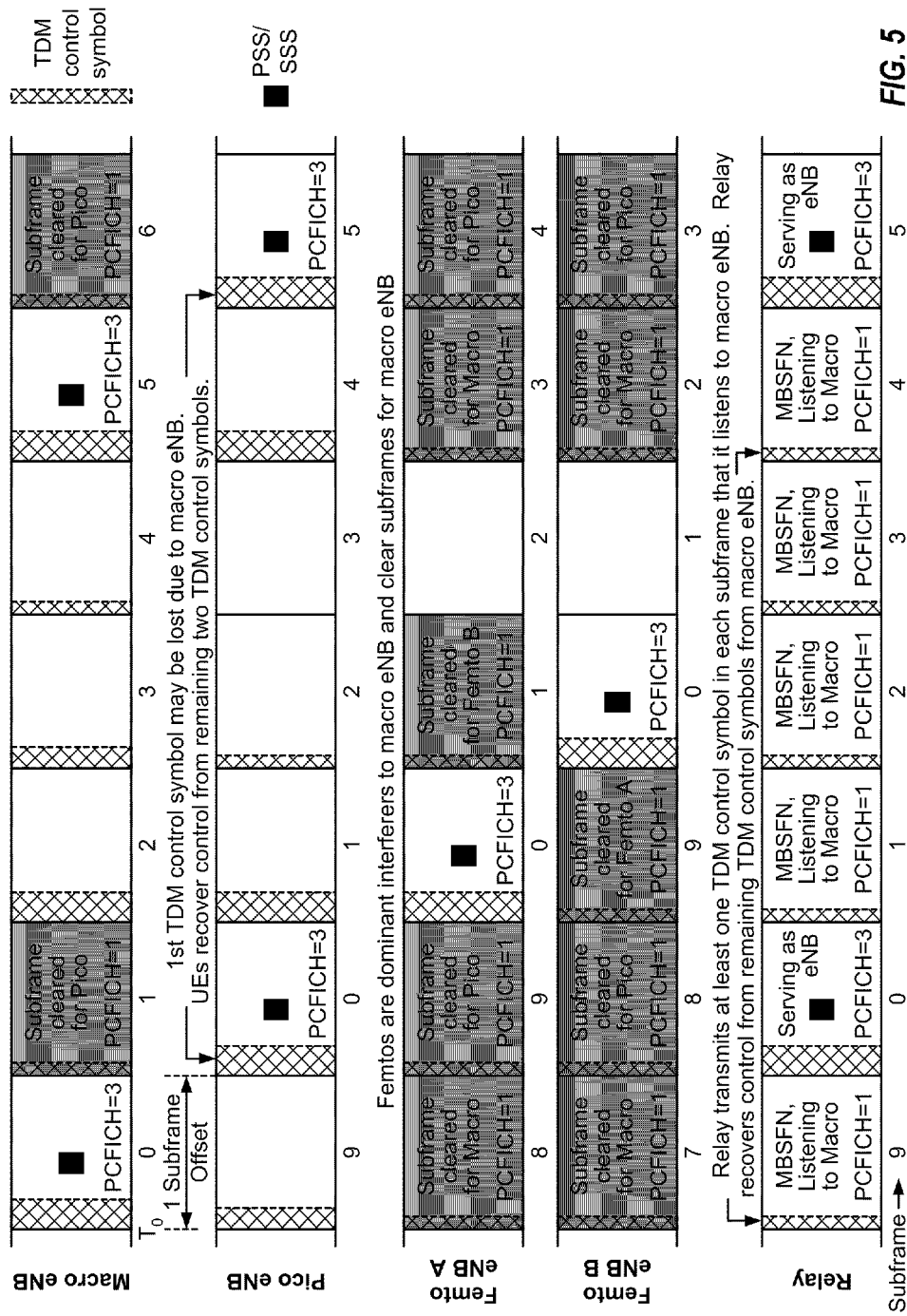
FIG. 5 shows an exemplary transmission timeline for different base stations.

FIG. 5 shows an exemplary transmission timeline for four groups of eNBs and relay. A first group may include macro eNB 110, which may have its subframe 0 starts at time $T_0$. A second group may include pico eNB 112 and relay 118, which may have their subframe 0 starts one subframe after time $T_0$. A third group may include femto eNB 114, which may have its subframe 0 starts two subframes after time $T_0$. A fourth group may include femto eNB 116, which may have its subframe 0 starts three subframes after $T_0$. In general, any number of groups may be formed, and each group may include any number of eNBs and/or relays.

In one design, a strong interfering eNB may reserve or clear some subframes for a weaker eNB to allow the weaker eNB to communicate with its UEs. The interfering eNB may transmit as little as possible in the reserved subframes in order to reduce interference to the weaker eNB. In one design, the interfering eNB may configure the reserved subframes as MBSFN subframes. The interfering eNB may transmit only the PCFICH with M=1 and the reference signal in the first symbol period of each reserved subframe and may transmit nothing in the remaining symbol periods of the subframe, e.g., as shown in FIG. 4. In another design, the interfering eNB may operate in a 1-Tx mode with one transmit antenna or a 2-Tx mode with two transmit antennas. The interfering eNB may transmit the PCFICH with M=1 and the reference signal in each reserved subframe, e.g., as shown in FIG. 3. In yet another design, the interfering eNB may transmit the reference signal but may avoid transmitting the PCFICH in the reserved subframes in order to reduce interference to the weaker eNB. For the designs described above, the interfering eNB may avoid transmitting other control channels, such as the PHICH and PDCCH, as well as data in each reserved subframe. In yet another design, the interfering eNB may transmit nothing in each reserved subframe in order to avoid causing any interference to the weaker eNB. The interfering eNB may also transmit in the reserved subframes in other manners. The interfering eNB may transmit the least number of modulation symbols required by the LTE standard in each reserved subframe.

In the example shown in FIG. 5, macro eNB 110 reserves subframes 1 and 6 for pico eNB 112 and transmits one TDM control symbol with M=1 for the PCFICH in each reserved subframe. Femto eNB 114 (femto eNB A) reserves subframes 3 and 8 for macro eNB 110, reserves subframes 4 and 9 for pico eNB 112, and reserves subframe 1 for femto eNB 116 (femto eNB B). Femto eNB 114 transmits one TDM control symbol with M=1 for the PCFICH in each reserved subframe. Femto eNB 116 reserves subframes 2 and 7 for macro eNB 110, reserves subframes 3 and 8 for pico eNB 112, and reserves subframe 9 for femto eNB 114. Femto eNB 116 transmits one TDM control symbol with M=1 for the PCFICH in each reserved subframe. As shown in FIG. 5, the subframes reserved for macro eNB 110 by femto eNBs 114 and 116 are time aligned and allow the macro eNB to transmit in its subframes 0 and 5 with little interference from the femto eNBs. The subframes reserved for pico eNB 112 by macro eNB 110 and femto eNBs 114 and 116 are time aligned and allow the pico eNB to transmit in its subframes 0 and 5 with little interference from the macro and femto eNBs.

Referring back to FIG. 2, each eNB may transmit its synchronization signals in subframes 0 and 5 and may also transmit the PBCH in subframe 0. A UE may search for the synchronization signals when detecting for eNBs and may receive the PBCH from each detected eNB in order to communicate with the eNB. To allow UEs to detect a weaker eNB, a strong interfering eNB may reserve or clear subframes in which the synchronization signals and the PBCH are transmitted by the weaker eNB. This clearing may be done for all subframes or only some subframes in which the synchronization signals and the PBCH are transmitted by the weaker eNB. The clearing should be done such that UEs can detect the weaker eNB in a reasonable amount of time.

Referring to the example shown in FIG. 5, subframes 0 and 5 of macro eNB 110 are cleared by femto eNBs 114 and 116 to avoid interference to the synchronization signals and the PBCH from the macro eNB. Subframes 0 and 5 of pico eNB 112 are cleared by macro eNB 110 and femto eNBs 114 and 116 to avoid interference to the synchronization signals and the PBCH from the pico eNB. Subframe 0 of femto eNB 114 is cleared by femto eNB 116, and subframe 0 of femto eNB 116 is cleared by femto eNB 114.

In one design, the eNBs may communicate via the backhaul to negotiate reservation/clearing of subframes. In another design, a UE desiring to communicate with a weaker eNB may request an interfering eNB to reserve some subframes for the weaker eNB. In yet another design, a designated network entity may decide reservation of subframes for the eNBs, e.g., based on data requests sent by UEs to different eNBs and/or reports from the eNBs. For all designs, subframes may be reserved based on various criteria such as loading at the eNBs, the number of eNBs in the vicinity, the number of UEs within the coverage of each eNB, pilot measurement reports from the UEs, etc. For example, a macro eNB may reserve a subframe to allow multiple pico eNBs and/or femto eNBs to communicate with their UEs, which may provide cell splitting gains.

Each eNB may transmit its reference signal on a set of subcarriers determined based on its cell ID. In one design, the cell ID space of strong interfering eNBs (such as macro eNBs) and weaker eNBs (such as pico eNBs) may be defined such that the reference signals of these eNBs are transmitted on different subcarriers and do not collide. Some eNBs (such as femto eNBs and relays) may be self-configuring. These eNBs may select their cell IDs such that their reference signals do not collide with the reference signals of strong neighboring eNBs.

A UE may communicate with a weaker eNB in a reserved subframe and may observe high interference due to the PCFICH, the reference signal, and possibly other transmissions from a strong interfering eNB. In one design, the UE may discard each TDM control symbol with high interference from the interfering eNB and may process remaining TDM control symbols. In another design, the UE may discard received symbols on subcarriers with high interference and may process remaining received symbols. The UE may also process the received symbols and the TDM control symbols in other manners.

The UE may obtain a channel estimate for the weaker eNB based on a reference signal transmitted by the weaker eNB. The reference signal of the weaker eNB may be transmitted on different subcarriers and may not overlap with the reference signal of the strong interfering eNB. In this case, the UE may derive a channel estimate for the weaker eNB based on the reference signal from this eNB. If the reference signal of the weaker eNB collides with the reference signal of the interfering eNB, then the UE may perform channel estimation with interference cancellation. The UE may estimate the interference due to the reference signal from the interfering eNB based on known reference symbols sent by this eNB and the known subcarriers on which the reference signal is transmitted. The UE may subtract the estimated interference from the received signal at the UE to remove the interference due to the interfering eNB and may then derive a channel estimate for the weaker eNB based on the interference-canceled signal. The UE may also perform interference cancellation for control channels (e.g., the PCFICH) from the interfering eNB that collide with the reference signal from the weaker eNB. The UE may decode each such control channel from the interfering eNB, estimate the interference due to each decoded control channel, subtract the estimated interference from the received signal, and derive the channel estimate for the weaker eNB after subtracting the estimated interference. In general, the UE may perform interference cancellation for any transmission from the interfering eNB which can be decoded in order to improve channel estimation performance. The UE may decode control channels (e.g., the PBCH, PHICH and PDCCH) as well as the data channel (e.g., the PDSCH) from the weaker eNB based on the channel estimate.

The weaker eNB may send control information and data to the UE in a subframe reserved by the interfering eNB. The interfering eNB may transmit only the first TDM control symbol in the subframe, e.g., as shown in FIG. 4. In this case, the UE may observe high interference on only the first TDM control symbol and may observe no interference from the interfering eNB on the remaining TDM control symbols in the subframe.

The weaker eNB may transmit control information in a manner to facilitate reliable reception by the UE in the presence of the interfering eNB. In one design, the weaker eNB may transmit three TDM control symbols in a reserved subframe by setting M=3 for the PCFICH. In another design, the weaker eNB may transmit a predetermined number of TDM control symbols in the reserved subframe. For both designs, the UE may be aware of the number of TDM control symbols being transmitted by the weaker eNB. The UE would not need to decode the PCFICH sent by the weaker eNB in the first TDM control symbol, which may observe high interference from the interfering eNB.

The weaker eNB may send three transmissions of the PHICH in three TDM control symbols, one PHICH transmission in each TDM control symbol. The UE may decode the PHICH based on the two PHICH transmissions sent in the second and third TDM control symbols, which may observe no interference from the interfering eNB. The UE may decode the PHICH based further on a portion of the PHICH transmission sent on subcarriers not used by the interfering eNB in the first TDM control symbol.

The weaker eNB may also send the PDCCH in three TDM control symbols. The weaker eNB may send the PDCCH to the UE such that adverse impact due to interference from the interfering eNB can be reduced. For example, the weaker eNB may send the PDCCH in TDM control symbols without interference from the interfering eNB, on subcarriers not used by the interfering eNB, etc.

The weaker eNB may be aware of the interference due to the interfering eNB and may transmit the control information to mitigate the adverse effects of the interference. In one design, the weaker eNB may scale the transmit power of the PHICH, the PDCCH, and/or other control channels to obtain the desirable performance. The power scaling may account for the loss of part of the control information due to puncturing by the high interference from the interfering eNB.

The UE may decode the control channels (e.g., the PHICH and PDCCH) from the weaker eNB with knowledge that some modulation symbols in the first TDM control symbol may be lost or punctured due to high interference from the interfering eNB. In one design, the UE may discard received symbols with high interference from the interfering eNB and may decode the remaining received symbols. The discarded symbols may be replaced with erasures and given neutral weight in the decoding process. In another design, the UE may perform decoding with interference cancellation for the control channels. The UE may estimate the interference due to the interfering eNB in the TDM control symbols, remove the estimated interference from the received symbols, and use the received symbols after interference cancellation to decode the control channels.

The UE may decode the data channel (e.g., PDSCH) from the weaker eNB, possibly with knowledge that some modulation symbols may be punctured due to high interference from the interfering eNB. In one design, the UE may discard received symbols with high interference from the interfering eNB and may decode the remaining received symbols to recover the data sent by the weaker eNB. In another design, the UE may perform decoding with interference cancellation for the data channel.

The UE may also decode the control and data channels from the weaker eNB based on other techniques to improve performance in the presence of high interference from the interfering eNB. For example, the UE may perform detection and/or decoding by taking into account high interference on certain received symbols.

The techniques described herein may be used to support operation by relays, e.g., relay 118. In the downlink direction, relay 118 may receive data and control information from macro eNB 110 and may retransmit the data and control information to UE 128. In the uplink direction, relay 118 may receive data and control information from UE 128 and may retransmit the data and control information to macro eNB 110. Relay 118 may appear like a UE to macro eNB 110 and like an eNB to UE 128. The link between macro eNB 110 and relay 118 may be referred to as a backhaul link, and the link between relay 118 and UE 128 may be referred to as a relay link.

Relay 118 typically cannot transmit and receive at the same time on the same frequency channel or bandwidth. In the downlink direction, relay 118 may designate some subframes as backhaul downlink subframes in which it will listen to macro eNB 110 and some subframes as relay downlink subframes in which it will transmit to UEs. In the uplink direction, relay 118 may designate some subframes as relay uplink subframes in which it will listen to the UEs and some subframes as backhaul uplink subframes in which it will transmit to macro eNB 110. In the example shown in FIG. 5, in the downlink direction, relay 118 may transmit to its UEs in subframes 0 and 5, which may be cleared by macro eNB 110, and may listen to macro eNB 110 in subframes 1, 2, 3, 4 and 9. The subframes for the uplink direction are not shown in FIG. 5.

In a range extension scenario, macro eNB 110 may be a strong interfering eNB to UEs communicating with relay 118 as well as new UEs that can be served by relay 118. For the relay downlink subframes in which relay 118 transmits to the UEs, the timing of relay 118 may be shifted by an integer number of subframes (e.g., by one subframe in FIG. 5) from the timing of macro eNB 110. Macro eNB 110 may clear some subframes (e.g., subframes 1 and 6 in FIG. 5) for relay 118. Relay 118 may transmit its synchronization signals and the PBCH in relay downlink subframes that coincide with the subframes reserved by macro eNB 110. UEs can detect the synchronization signals from relay 118. The UEs may be aware of symbols punctured by macro eNB 110 and may make use of this information to decode the control channels from relay 118, as described above.

For the backhaul downlink subframes, relay 118 may desire to only listen to macro eNB 110 and may not desire to transmit anything to its UEs in these subframes. However, since relay 118 is an eNB to its UEs, relay 118 may be expected to transmit some signals to its UEs in the backhaul downlink subframes. In one design, relay 118 may operate in the MBSFN mode for the backhaul downlink subframes. In the MBSFN mode, relay 118 may transmit only in the first symbol period of a backhaul downlink subframe and may listen to macro eNB 110 in the remaining symbol periods of the subframe. In the example shown in FIG. 5, relay 118 transmits in only the first symbol period of subframes 1, 2, 3, 4 and 9, which are subframes in which relay 118 listens to macro eNB 110.

In one design, macro eNB 110 may set the PCFICH to a predetermined value (e.g., M=3) in subframes in which macro eNB 110 transmits to relay 118 (e.g., subframes 0 and 5 of macro eNB 110 in FIG. 5). Relay 118 may know the predetermined value of the PCFICH from macro eNB 110 and may skip decoding the PCFICH. Relay 118 may transmit the PCFICH to its UEs in the first symbol period and may skip decoding the PCFICH sent by macro eNB 110 in the same symbol period. Macro eNB 110 may send three transmissions of the PHICH, one transmission in each TDM control symbol. Relay 118 may decode the PHICH from macro eNB 110 based on the PHICH transmissions in the second and third TDM control symbols. Macro eNB 110 may also send the PDCCH such that all or most of a PDCCH transmission for relay 118 is sent in the second and third TDM control symbols. Relay 118 may decode the PDCCH based on the portion of the PDCCH transmission received in the second and third TDM control symbols. Macro eNB 110 may boost the transmit power of the control channels (e.g., the PHICH and/or PDCCH) intended for relay 118 to improve reception of the control channels by relay 118 based on the part sent in the second and third TDM control symbols. Macro eNB 110 may also skip transmitting control information in the first TDM control symbol to relay 118. Macro eNB 110 may send data to relay 118 in symbol periods 3 through 13. Relay 118 may recover the data in the normal manner.

Relay 118 may be unable to receive the reference signal from macro eNB 110 in symbol period 0. Relay 118 may derive a channel estimate for macro eNB 110 based on the reference signal that relay 118 can receive from macro eNB 110. When scheduling relay 118, macro eNB 110 may make use of the information about which subframes are likely to have better channel estimates by relay 118. For example, relay 118 may listen to macro eNB 110 in two contiguous subframes. In this case, the channel estimate for the first subframe may be worse than the channel estimate for the second subframe since the channel estimate for the first subframe may be extrapolated whereas the channel estimate for the second subframe may be interpolated and may have more reference symbols around it. Macro eNB 110 may then send data to relay 118 in the second subframe, if possible.

Relay 118 may not be able to operate in the MBSFN mode in its subframes 0 and 5, which carry the synchronization signals. In one design, relay 118 may skip listening to macro eNB 110 in subframes 0 and 5 of relay 118, even if these subframes are designated as backhaul downlink subframes, and may instead transmit to its UEs. In another design, relay 118 may skip transmitting to its UEs in subframes 0 and 5, even if these subframes are designated as relay downlink subframes, and may instead listen to macro eNB 110. Relay 118 may also perform a combination of both and may transmit to its UEs in some of subframes 0 and 5 and may listen to macro eNB 110 in some other subframes 0 and 5.

In the uplink direction, relay 118 may operate in a similar manner as a UE in the backhaul uplink subframes in which relay 118 transmits data and control information to macro eNB 110. Relay 118 may operate in a similar manner as an eNB in the relay uplink subframes in which relay 118 listens for data and control information from UE 128. A scheduler at macro eNB 110 and/or a scheduler at relay 118 may ensure that the uplink of relay 118 and the uplink of UEs served by relay 118 are scheduled appropriately.

Figure 6:
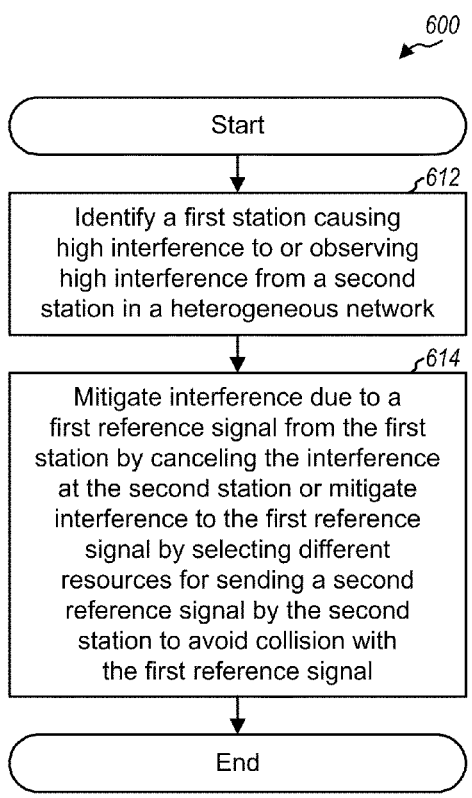
FIGS. 6 and 7 show a process and an apparatus, respectively, for mitigating interference in a wireless communication network.

FIG. 6 shows a design of a process 600 for mitigating interference in a wireless communication network. Process 600 may be performed by a UE, a base station/eNB, a relay station, or some other entity. A first station causing high interference to or observing high interference from a second station in a heterogeneous network may be identified (block 612). The heterogeneous network may comprise base stations of at least two different transmit power levels and/or different association types. Interference due to a first reference signal from the first station may be mitigated by canceling the interference at the second station, or interference to the first reference signal may be mitigated by selecting different resources for sending a second reference signal by the second station to avoid collision with the first reference signal (block 614).

In one design, the first station may be a base station or a relay station, and the second station may be a UE. For block 614, the interference due to the first reference signal may be canceled at the UE. In one design, the interference due to the first reference signal may be estimated and subtracted from a received signal at the UE to obtain an interference-canceled signal. The interference-canceled signal may then be processed to obtain a channel estimate for a base station or a relay station with which the UE is in communication. The interference-canceled signal may also be processed to obtain data and/or control information sent by the base station or the relay station to the UE.

In another design, the first and second stations may comprise (i) a macro base station and a pico base station, respectively, (ii) two femto base stations, or (iii) some other combination of macro, pico, and femto base stations and relay station. For block 614, first resources used to send the first reference signal by the first station may be determined. A cell ID associated with second resources for sending the second reference signal may be selected such that the second resources are different from the first resources. The first resources may comprise a first set of subcarriers, and the second resources may comprise a second set of subcarriers, which may be different from the first set of subcarriers. The second reference signal may be sent on the second resources by the second station and may then avoid collision with the first reference signal. A primary synchronization signal and a secondary synchronization signal may be generated based on the selected cell ID and may be sent by the second station in designated subframes, e.g., subframes 0 and 5.

Figure 7:
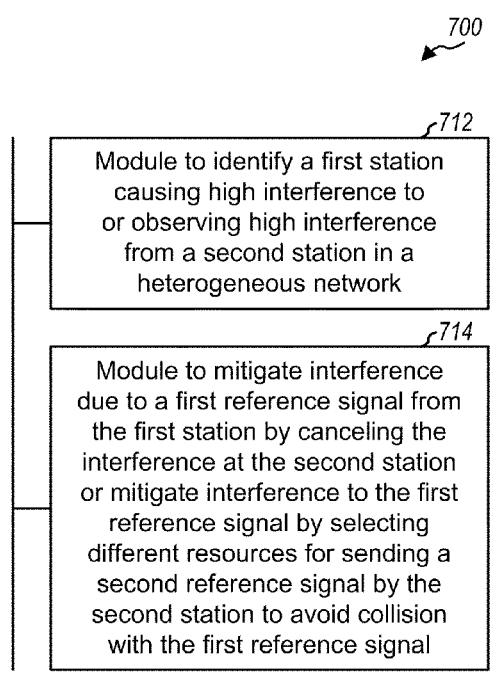

FIG. 7 shows a design of an apparatus 700 for mitigating interference. Apparatus 700 includes a module 712 to identify a first station causing high interference to or observing high interference from a second station in a heterogeneous network, and a module 714 to mitigate interference due to a first reference signal from the first station by canceling the interference at the second station or mitigate interference to the first reference signal by selecting different resources for sending a second reference signal by the second station to avoid collision with the first reference signal FIG. 8 shows a design of a process 800 for operating a relay station in a wireless communication network. The relay station may determine subframes in which it listens to a macro base station (block 812). The relay station may transmit in an MBSFN mode in the subframes in which it listens to the macro base station (block 814). The relay station may also determine subframes in which it transmits to UEs (block 816). The relay station may transmit in a regular mode in the subframes in which it transmits to the UEs (block 818).

The relay station may send a reference signal in fewer symbol periods in a given subframe in the MBSFN mode than the regular mode. In one design, the relay station may transmit the reference signal from each antenna in one symbol period of each subframe in which the relay station listens to the macro base station in the MBSFN mode, e.g., as shown in FIG. 4. The relay station may transmit the reference signal from each antenna in multiple symbol periods of each subframe in which the relay station transmits to the UEs in the regular mode, e.g., as shown in FIG. 3. In one design, the relay station may transmit the reference signal in only the first symbol period or only the first two symbol periods of each subframe in which the relay station listens to the macro base station in the MBSFN mode. The relay station may transmit the reference signal in more symbol periods across each subframe in which the relay station transmits to the UEs in the regular mode. The relay station may also transmit the reference signal in other manners in the MBSFN mode and the regular mode.

In one design of block 814, the relay station may transmit a single TDM control symbol and may transmit no data in each subframe in which it listens to the macro base station. The relay station may receive a maximum number of (e.g., three) TDM control symbols from the macro base station in each subframe in which the macro base station transmits to the relay station. The relay station may decode at least one control channel (e.g., the PHICH and PDCCH) from the macro base station based on the second and third TDM control symbols.

FIG. 9 shows a design of an apparatus 900 for operating a relay station. Apparatus 900 includes a module 912 to determine subframes in which a relay station is listening to a macro base station, a module 914 to transmit in an MBSFN mode by the relay station in the subframes in which the relay station is listening to the macro base station, a module 916 to determine subframes in which the relay station is transmitting to UEs, and a module 918 to transmit in the regular mode by the relay station in the subframes in which the relay station is transmitting to the UEs.

FIG. 10 shows a design of a process 1000 for transmitting control information in a wireless communication network. Process 1000 may be performed by a first station, which may be a base station/eNB, a relay station, or some other entity. The first station may identify a strong interfering station to the first station (block 1012). The first station may determine a first number of TDM control symbols being transmitted by the strong interfering station in a subframe (block 1014). The first station may transmit a second number of TDM control symbols in the subframe, with the second number of TDM control symbols being more than the first number of TDM control symbols (block 1016). The second number of TDM control symbols may be the maximum number of TDM control symbols allowed for the first station and may comprise three TDM control symbols.

The first station and the strong interfering station may have different transmit power levels. In one design, the first station may be a pico base station, and the interfering station may be a macro base station. In another design, the first station may be a macro base station, and the interfering station may be a femto base station, or vice versa. In yet another design, the first station may be a femto base station, and the interfering station may be another femto base station. The first station and the strong interfering station may also be some other combination of macro base station, pico base station, femto base station, relay station, etc.

In one design, the first station may transmit a control channel (e.g., the PCFICH) indicating the second number of TDM control symbols being transmitted in the subframe if the strong interfering station is not present. The first station may not transmit the control channel if the strong interfering station is present. In this case, a predetermined value may be assumed for the second number of TDM control symbols.

In one design of block 1016, the first station may transmit a control channel (e.g., the PHICH or PDCCH) in a first TDM control symbol at a first transmit power level. The first station may transmit the control channel in at least one additional TDM control symbol at a second transmit power level, which may be higher than the first transmit power level. In another design of block 1016, the first station may transmit a control channel (e.g., the PHICH or PDCCH) in the second number of TDM control symbols on resource elements selected to avoid or reduce collision with a reference signal from the strong interfering station. The first station may also transmit the second number of TDM control symbols in other manners to mitigate the effects of interference from the strong interfering station.

FIG. 11 shows a design of an apparatus 1100 for transmitting control information. Apparatus 1100 includes a module 1112 to identify a strong interfering station to a first station, a module 1114 to determine a first number of TDM control symbols being transmitted by the strong interfering station in a subframe, and a module 1116 to transmit a second number of TDM control symbols by the first station in the subframe, the second number of TDM control symbols being more than the first number of TDM control symbols.

The modules in FIGS. 7, 9 and 11 may comprise processors, electronics devices, hardware devices, electronics components, logical circuits, memories, software codes, firmware codes, etc., or any combination thereof.

Figure 12:
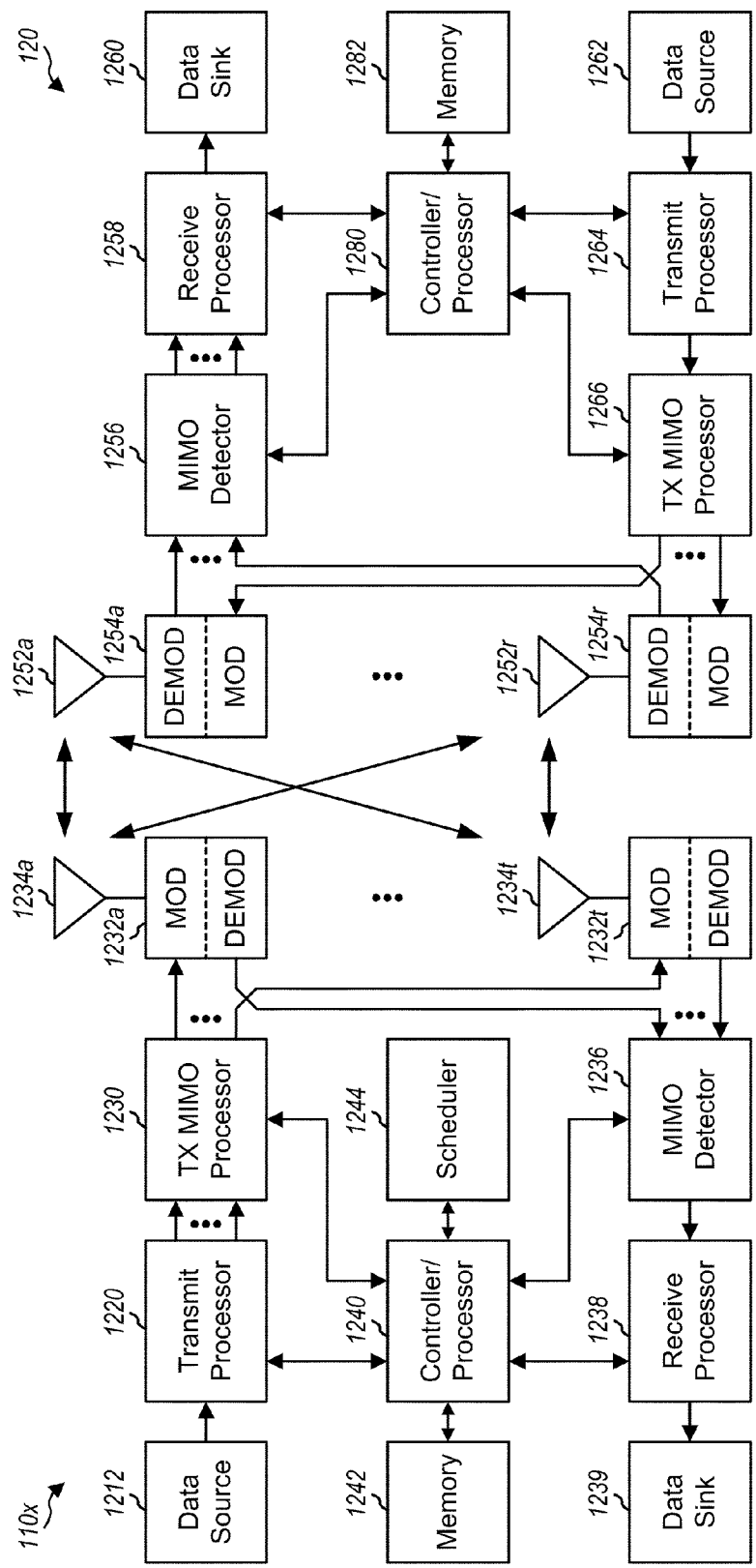
FIG. 12 shows a block diagram of a base station or a relay station and a UE.

FIG. 12 shows a block diagram of a design of a station 110x and a UE 120. Station 110x may be macro base station 110, pico base station 112, femto base station 114 or 116, or relay station 118 in FIG. 1. UE 120 may be any of the UEs in FIG. 1. Station 110x may be equipped with T antennas 1234a through 1234t, and UE 120 may be equipped with R antennas 1252a through 1252r, where in general T≥1 and R≥1.

At station 110x, a transmit processor 1220 may receive data from a data source 1212 and control information from a controller/processor 1240. The control information may be for the PBCH, PCFICH, PHICH, PDCCH, etc. The data may be for the PDSCH, etc. Processor 1220 may process (e.g., encode and symbol map) the data and control information to obtain data symbols and control symbols, respectively. Processor 1220 may also generate reference symbols, e.g., for the PSS, SSS, and cell-specific reference signal. A transmit (TX) multiple-input multiple-output (MIMO) processor 1230 may perform spatial processing (e.g., preceding) on the data symbols, the control symbols, and/or the reference symbols, if applicable, and may provide T output symbol streams to T modulators (MODs) 1232a through 1232t. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink signal. T downlink signals from modulators 1232a through 1232t may be transmitted via T antennas 1234a through 1234t, respectively.

At UE 120, antennas 1252a through 1252r may receive the downlink signals from station 110x and may provide received signals to demodulators (DEMODs) 1254a through 1254r, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate, deinterleave, and decode) the detected symbols, provide decoded data for UE 120 to a data sink 1260, and provide decoded control information to a controller/processor 1280.

On the uplink, at UE 120, a transmit processor 1264 may receive and process data (e.g., for the PUSCH) from a data source 1262 and control information (e.g., for the PUCCH) from controller/processor 1280. Processor 1264 may also generate reference symbols for a reference signal. The symbols from transmit processor 1264 may be precoded by a TX MIMO processor 1266 if applicable, further processed by modulators 1254a through 1254r (e.g., for SC-FDM, etc.), and transmitted to station 110x. At station 110x, the uplink signals from UE 120 may be received by antennas 1234, processed by demodulators 1232, detected by a MIMO detector 1236 if applicable, and further processed by a receive processor 1238 to obtain decoded data and control information sent by UE 120. Processor 1238 may provide the decoded data to a data sink 1239 and the decoded control information to controller/processor 1240.

Controllers/processors 1240 and 1280 may direct the operation at station 110x and UE 120, respectively. Processor 1240 and/or other processors and modules at station 110x may perform or direct process 600 in FIG. 6, process 800 in FIG. 8, process 1000 in FIG. 10, and/or other processes for the techniques described herein. Processor 1280 and/or other processors and modules at UE 120 may perform or direct process 600 in FIG. 6 and/or other processes for the techniques described herein. Memories 1242 and 1282 may store data and program codes for station 110x and UE 120, respectively. A scheduler 1244 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication at a relay station communicating using a set of uplink subframes and a set of downlink subframes, comprising:
   determining, at the relay station, a first set of backhaul downlink subframes in which the relay station is listening to a macro base station and a second set of relay downlink subframes in which the relay station is transmitting data to user equipments (UEs), wherein the first set of backhaul downlink subframes comprise a first subset of the set of downlink subframes and the second set of relay downlink subframes comprise a second subset of the set of downlink subframes;
   transmitting to the UEs, by the relay station, in a multicast/broadcast single frequency network (MBSFN) mode on a frequency channel or bandwidth during each of the first set of backhaul downlink subframes in which the relay station is listening to the macro base station, wherein the relay station transmits to the UEs in the MBSFN mode in place of receiving a first set of time division multiplexed (TDM) control symbols of a plurality of TDM control symbols from the macro base station in the first set of backhaul downlink subframes, and wherein the relay station derives control information from a second set of the plurality of TDM control symbols received from the macro base station not overlapping the first set of TDM control symbols; and
   listening to the macro base station, by the relay station, on the same frequency channel or bandwidth during each of the first set of backhaul downlink subframes; and
   transmitting to the UEs, by the relay station, in a regular mode on the same frequency channel or bandwidth during each of the second set of relay downlink subframes in which the relay station is transmitting data to the UEs.

2. The method of claim 1, wherein the transmitting in the MBSFN mode comprises transmitting a reference signal from each antenna in one symbol period of each backhaul downlink subframe in which the relay station is listening to the macro base station, and wherein the transmitting in the regular mode comprises transmitting the reference signal from each antenna in multiple symbol periods of each relay subframe in which the relay station is transmitting to the UEs.

3. The method of claim 1, wherein the transmitting in the MBSFN mode comprises transmitting a reference signal in only a first symbol period of each backhaul downlink subframe in which the relay station is listening to the macro base station.

4. The method of claim 1, wherein the transmitting in the MBSFN mode comprises transmitting a single time division multiplexed (TDM) control symbol and no data in each backhaul downlink subframe in which the relay station is listening to the macro base station.

5. The method of claim 1, further comprising:
   receiving a maximum number of time division multiplexed (TDM) control symbols from the macro base station in each backhaul downlink subframe in which the macro base station transmits to the relay station.

6. The method of claim 4, wherein the single TDM control symbol is sent in a first symbol period of each backhaul downlink subframe in which the relay station is listening to the macro base station, the method further comprising:
   receiving TDM control symbols in second and third symbol periods of each backhaul downlink subframe in which the relay station is listening to the macro base station, and
   decoding at least one control channel from the macro base station based on the received TDM control symbols.

7. An apparatus for wireless communication at a relay station communicating using a set of uplink subframes and a set of downlink subframes, comprising:
   means for determining, at the relay station, a first set of backhaul downlink subframes in which the relay station is listening to a macro base station;
   means for determining, at the relay station, a second set of relay downlink subframes in which the relay station is transmitting data to user equipments (UEs)), wherein the first set of backhaul downlink subframes comprise a first subset of the set of downlink subframes and the second set of relay downlink subframes comprise a second subset of the set of downlink subframes;
means for transmitting to the UEs, by the relay station, in a multicast/broadcast single frequency network (MBSFN) mode on a frequency channel or bandwidth during each of the first set of backhaul downlink subframes in which the relay station is listening to the macro base station, wherein the relay station transmits to the UEs in the MBSFN mode in place of receiving a first set of time division multiplexed (TDM) control symbols of a plurality of TDM control symbols from the macro base station in the first set of backhaul downlink subframes, and wherein the relay station derives control information from a second set of the plurality of TDM control symbols received from the macro base station not overlapping the first set of TDM control symbols;
means for listening to the macro base station, by the relay station, on the same frequency channel or bandwidth during each of the first set of backhaul downlink subframes; and
means for transmitting to the UEs, by the relay station, in a regular mode on the same frequency channel or bandwidth during each of the second set of relay downlink subframes in which the relay station is transmitting data to the UEs.

8. The apparatus of claim 7, wherein the means for transmitting in the MBSFN mode is configured to transmit a reference signal in only a first symbol period of each backhaul downlink subframe in which the relay station is listening to the macro base station.

9. The apparatus of claim 7, wherein the means for transmitting in the MBSFN mode is configured to transmit a single time division multiplexed (TDM) control symbol and no data in each backhaul downlink subframe in which the relay station is listening to the macro base station.

10. The apparatus of claim 7, wherein the means for transmitting in the MBSFN mode is configured to transmit a reference signal from each antenna in one symbol period of each backhaul downlink subframe in which the relay station is listening to the macro base station, and wherein the means for transmitting in the regular mode is configured to transmit the reference signal from each antenna in multiple symbol periods of each relay downlink subframe in which the relay station is transmitting to the UEs.

11. An apparatus for wireless communication at a relay station communicating using a set of uplink subframes and a set of downlink subframes, comprising:
a memory;
at least one processor coupled to the memory, and configured to:
determine, at the relay station, a first set of backhaul downlink subframes in which the relay station is listening to a macro base station and a second set of relay downlink subframes in which the relay station is transmitting data to user equipments (UEs), wherein the first set of backhaul downlink subframes comprise a first subset of the set of downlink subframes and the second set of relay downlink subframes comprise a second subset of the set of downlink subframes;
transmit to the UEs, by the relay station, in a multicast/broadcast single frequency network (MBSFN) mode on a frequency channel or bandwidth during each of the first set of backhaul downlink subframes in which the relay station is listening to the macro base station, wherein the relay station transmits to the UEs in the MBSFN mode in place of receiving a first set of time division multiplexed (TDM) control symbols of a plurality of TDM control symbols from the macro base station in the first set of backhaul downlink subframes, and wherein the relay station derives control information from a second set of the plurality of TDM control symbols received from the macro base station not overlapping the first set of TDM control symbols;
listen to the macro base station, by the relay station, on the same frequency channel or bandwidth during each of the first set of backhaul downlink subframes; and
transmit to the UEs, by the relay station, in a regular mode on the same frequency channel or bandwidth during each of the second set of relay downlink subframes in which the relay station is transmitting data to the UEs.

12. The apparatus of claim 11, wherein the at least one processor is configured to transmit in the MBSFN mode by transmitting a reference signal from each antenna in one symbol period of each backhaul downlink subframe in which the relay station is listening to the macro base station, and wherein the at least one processor is configured to transmit in the regular mode by transmitting the reference signal from each antenna in multiple symbol periods of each relay downlink subframe in which the relay station is transmitting to the UEs.

13. The apparatus of claim 11, wherein the at least one processor is configured to transmit in the MBSFN mode by transmitting a reference signal in only a first symbol period of each backhaul downlink subframe in which the relay station is listening to the macro base station.

14. The apparatus of claim 11, wherein the at least one processor is configured to transmit in the MBSFN mode by transmitting a single time division multiplexed (TDM) control symbol and no data in each backhaul downlink subframe in which the relay station is listening to the macro base station.

15. A non-transitory computer-readable storage medium storing executable code for wireless communication at a relay station communicating using a set of uplink subframes and a set of downlink subframes, comprising code for:
determining, at the relay station, a first set of backhaul downlink subframes in which the relay station is listening to a macro base station and a second set of relay downlink subframes in which the relay station is transmitting data to user equipments (UEs), wherein the first set of backhaul downlink subframes comprise a first subset of the set of downlink subframes and the second set of relay downlink subframes comprise a second subset of the set of downlink subframes;
transmitting to the UEs, by the relay station, in a multicast/broadcast single frequency network (MBSFN) mode on a frequency channel or bandwidth during each of the first set of backhaul downlink subframes in which the relay station is listening to the macro base station, wherein the relay station transmits to the UEs in the MBSFN mode in place of receiving a first set of time division multiplexed (TDM) control symbols of a plurality of TDM control symbols from the macro base station in the first set of backhaul downlink subframes, and wherein the relay station derives control information from a second set of the plurality of TDM control symbols received from the macro base station not overlapping the first set of TDM control symbols; and listening to the macro base station, by the relay station, on the same frequency channel or bandwidth during each of the first set of backhaul downlink subframes; and transmitting to the UEs, by the relay station, in a regular mode on the same frequency channel or bandwidth during each of the second set of relay downlink subframes in which the relay station is transmitting data to the UEs.

16. The non-transitory computer-readable storage medium of claim 15, wherein the code for transmitting in the MBSFN mode transmits a reference signal from each antenna in one symbol period of each backhaul downlink subframe in which the relay station is listening to the macro base station, and wherein the code for transmitting in the regular mode transmits the reference signal from each antenna in multiple symbol periods of each relay downlink subframe in which the relay station is transmitting to the UEs.

17. The non-transitory computer-readable storage medium of claim 15, wherein the code for transmitting in the MBSFN mode transmits a reference signal in only a first symbol period of each backhaul downlink subframe in which the relay station is listening to the macro base station.

18. The non-transitory computer-readable storage medium of claim 15, wherein the code for transmitting in the MBSFN mode transmits a single time division multiplexed (TDM) control symbol and no data in each backhaul downlink subframe in which the relay station is listening to the macro base station.

19. The method of claim 1, wherein transmitting, by the relay station, in the MBSFN mode, comprises transmitting, by the relay station, in the MBSFN mode to the UEs during a first portion of each of the first set of backhaul downlink subframes.

20. The apparatus of claim 7, wherein the means for transmitting, by the relay station, in the MBSFN mode, transmits in the MBSFN mode to the UEs during a first portion of each of the first set of backhaul downlink subframes.

21. The apparatus of claim 11, wherein the processor is configured to transmit in the MBSFN mode to the UEs during a first portion of each of the first set of backhaul downlink subframes.

22. The non-transitory computer-readable storage medium of claim 15, wherein the code for transmitting, by the relay station, in the MBSFN mode, comprises code for transmitting, by the relay station, in the MBSFN mode to the UEs during a first portion of each of the first set of backhaul downlink subframes.

23. The method of claim 1, wherein the relay station transmits in the MBSFN mode and listens to the macro base station within a single backhaul downlink subframe for each backhaul downlink subframe of the first set of backhaul downlink subframes.

* * * * *